J. W. MULVEY.
Toothless Harrow.
No. 212,393. Patented Feb. 18, 1879.
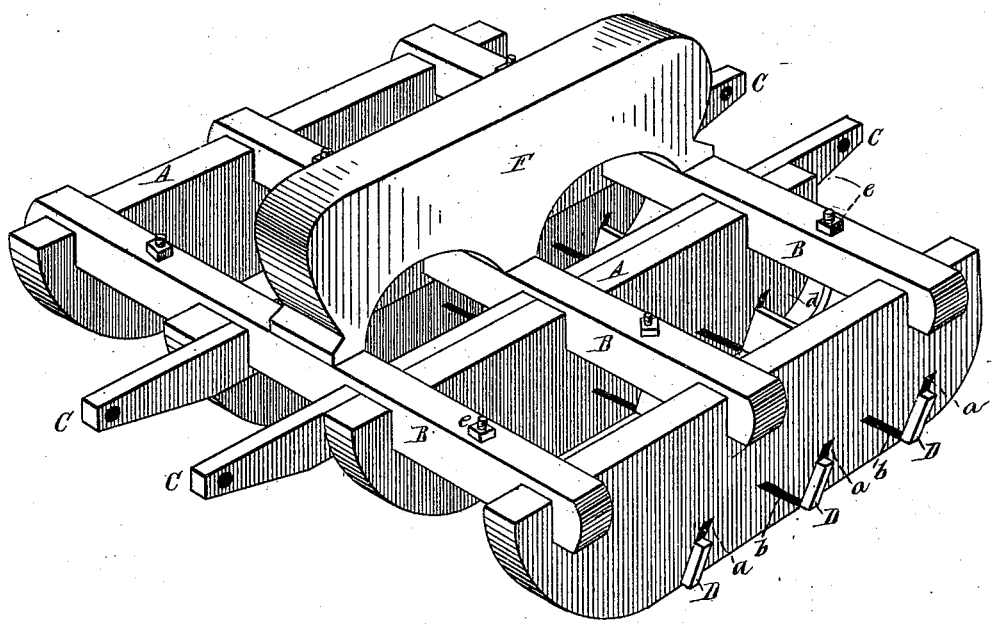
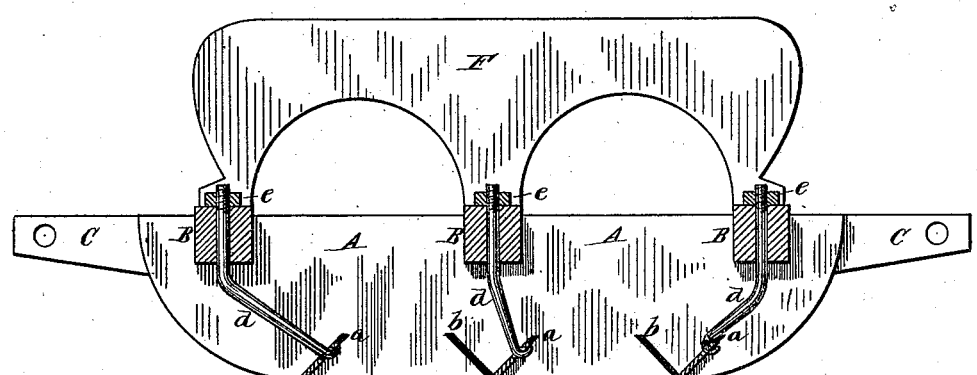
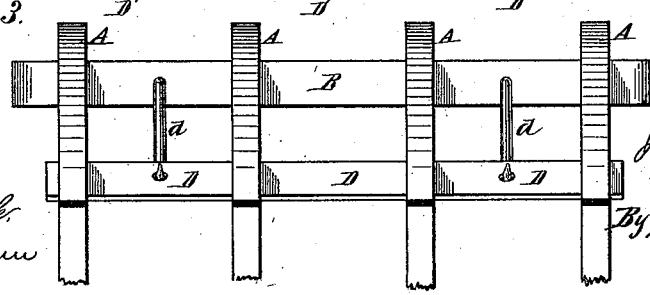

UNITED STATES PATENT OFFICE.

JAMES W. MULVEY, OF KIDDER, MISSOURI.

IMPROVEMENT IN TOOTHLESS HARROWS.

Specification forming part of Letters Patent No. 212,393, dated February 18, 1879; application filed December 4, 1878.

*To all whom it may concern:*

Be it known that I, JAMES W. MULVEY, of Kidder, county of Caldwell, and State of Missouri, have invented certain new and useful Improvements in Toothless Harrows, of which the following is a full, clear, and exact description, reference being had to the accompanying drawings, and to the letters of reference marked thereon.

Figure 1 is a perspective view of an implement constructed in accordance with my several improvements. Fig. 2 is a longitudinal section upon a plane passing through the adjusting-rods, the driver's seat, one of the runners, and the pole attachment being shown in elevation. Fig. 3 is a plan view of a portion of the under side of the implement, showing the location and arrangement of one of the adjustable bars and its connected adjusting-rods.

Like letters in all the figures indicate corresponding parts.

The purpose or object of my invention is to produce a simple, durable, and efficient implement for use after the manner and for the general purposes of the ordinary harrow, but which shall be capable of leaving the ground smooth and unfurrowed, of covering the seeds in a more thorough and effectual manner, and of being transported more easily, as well as being capable of operating when drawn in either direction.

To accomplish all of this the invention consists in certain novel and useful arrangements or combinations of parts, all of which will be hereinafter first fully described, and then pointed out in the claims.

Two, three, four, or more runners, A A A A, are firmly secured together at top by suitable cross-bars or connecting-pieces B B B, and so that they shall remain substantially parallel with each other. Each runner is curved at each end, so that the implement may be moved in either direction desired; and for the attachment of the pole or other device a pair of hounds, C C, are suitably connected with the runners or with the frame-work over them, as indicated in Figs. 1 and 2. Under ordinary circumstances four runners will be employed, and it will be found most convenient to secure the two hounds between the two middle runners, as shown; but for all purposes of the invention any desirable mode of connecting them may be adopted; or the implement may be drawn by use of an ordinary clevis connected with one of the runners, or by use of any known form of connecting device.

From the plane face or base of each of the runners which moves along upon the soil a number of slits, as $a\,a\,a$, are cut upwardly, and inclined toward the base at an angle of about forty-five degrees. A number of other slits, $b\,b$, are similarly cut, but made to incline in the opposite direction, as plainly indicated. Within these slits are located the operating-bars D D D, and these are made adjustable by means of the rods $d\,d\,d$, &c., each of which is provided with some convenient form of adjusting screw or nut, as $e\,e$, &c. Each of these bars is preferably made to project about an inch beyond the outside runners, and it is obvious that when they are lowered sufficiently they will come in contact with the soil, or when elevated through the medium of the adjusting-rods $d\,d$ the implement will rest entirely upon the plane lower faces of the runners, and may then be easily moved from place to place without disturbing the ground.

If the implement be arranged as indicated in Figs. 1 and 2, and it be moved over the ground in a direction toward the right-hand side of the figure, (after the bars are so lowered as to perform their required offices,) the entire soil between the outside runners will be passed over and operated upon by each of the three bars D D D; and since these bars are inclined upwardly and in the direction of the motion of the machine, their tendency will be to thoroughly smooth the ground and to more effectually cover the distributed seeds than could be done by a number of detached teeth, such as are used in the ordinary harrows.

The forward bar may, if desired, be located in the oppositely-inclined slits $b$, when it will tend to loosen up the soil over which it passes, which soil will be afterward smoothed out by the succeeding bars; or the central bar only may be reversed. In the latter case the first bar will smooth the soil, the central bar will plow it up sufficiently to mingle the seeds thoroughly with it, and the third bar will smooth it out again.

Since the several bars are readily changeable from one set of slits to another, it is apparent that they may be arranged with respect to each other as may be desired, and that they may be so placed as to enable either end of the machine to be constituted the front at pleasure.

The slits are made a little wider than the bars which they accommodate, so that said bars may be elevated as much as may be necessary; but the walls of the slits should bear against the bars sufficiently to afford a good and substantial foundation or seat for them, and so as to exclude dirt, &c., which might otherwise interfere with their proper and easy manipulation.

To properly balance and load the machine, the driver's seat F is made to extend from front to rear, or from one end to the other. It is mounted in some suitable manner upon the frame-work of the machine, and affords a good riding-seat for the driver at any point within its length. Upon this seat the driver may take position in such manner that his weight will operate most effectually either in increasing the operating capacity of the implement or in diminishing the draft, as occasion may require.

The machine may be weighted, if desired, by any amount of additional weight placed upon it, such as stones, earth, &c.; and if additional weight be required, the runners may be floored over, in which event the cross-braces B B might be dispensed with and the rods d d made to project through the flooring. Boxes might easily be located properly upon the machine for the reception of the weighting material.

It is preferred to make the bars D D of metal; but one or all of them may be made of a tough variety of wood; and they may be made to extend only between two contiguous runners, and may be placed vertically as well as in an inclined position. Very good results would follow the use of these bars if not adjustable; but it is preferred to arrange them as shown. The runners are preferably of wood, though they may be made of metal, if desired.

The size and proportions of the machine are, of course, not material to the invention; but the best proportions for a single machine are probably these: operating-bars, about one-fourth inch thick, about four inches broad, and about four feet long; wooden runners, about two inches thick, twelve inches wide, and about five feet long on top and three feet on the bottom.

For a double or two-horse machine, the bars might be eight feet long, and the runners same as in the single machine; or any desired proportions may be adopted, attention being given to the required strength and rigidity of the material and the kind of work required to be performed.

When constructed and arranged in accordance with the foregoing explanations, the improved implement will be found to answer fully the purposes and objects of the invention, as previously stated, and to be specially advantageous in view of the ease of operation, the thoroughness with which it will pulverize the soil and smooth it over, and the evenness with which it will cover seeds sown broadcast.

The facility with which the machine may be constructed is not the least of the numerous characteristics which will recommend it for use or adoption.

I desire to add that I am fully aware of numerous forms of harrows having independent teeth, like the ordinary "drag" and cultivator, and am also aware of the fact that sulky-harrows having such independent teeth have been provided with wheels to be used in transportation. To these old forms I make no claim; but,

Having now fully described my invention, what I do claim as new, and desire to secure by Letters Patent, is—

1. The herein-described harrow-runners, located in parallel planes, and each provided with a number of oppositely-inclined slits, $a\,b$, for the accommodation of the adjustable bars, substantially as shown and described.

2. The herein-described toothless harrow, composed of the runners A, having the inclined slits $a\,b$, the adjustable bars D, adjusting devices $d\,e$, cross-pieces B B, and driver's seat F, the whole combined and arranged to operate substantially as shown and described.

In testimony that I claim the foregoing I have hereunto set my hand in the presence of two witnesses.

JAMES W. MULVEY.

Witnesses:
JAMES BEAUMONT,
E. D. SACKETT.